(12) United States Patent
Langhammer

(10) Patent No.: US 10,613,831 B2
(45) Date of Patent: Apr. 7, 2020

(54) METHODS AND APPARATUS FOR PERFORMING PRODUCT SERIES OPERATIONS IN MULTIPLIER ACCUMULATOR BLOCKS

(71) Applicant: Altera Corporation, San Jose, CA (US)

(72) Inventor: Martin Langhammer, Salisbury (GB)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 16/049,855

(22) Filed: Jul. 31, 2018

(65) Prior Publication Data
US 2018/0341461 A1    Nov. 29, 2018

Related U.S. Application Data

(63) Continuation of application No. 14/919,429, filed on Oct. 21, 2015, now Pat. No. 10,037,192.

(51) Int. Cl.
*G06F 7/523* (2006.01)
*G06F 7/544* (2006.01)
*G06F 7/57* (2006.01)

(52) U.S. Cl.
CPC ............ *G06F 7/523* (2013.01); *G06F 7/5443* (2013.01); *G06F 7/57* (2013.01)

(58) Field of Classification Search
None
See application file for complete search history.

(56) References Cited

U.S. PATENT DOCUMENTS

| | | | |
|---|---|---|---|
| 4,916,651 A | 4/1990 | Gill et al. | |
| 7,567,997 B2 | 7/2009 | Simkins et al. | |

(Continued)

FOREIGN PATENT DOCUMENTS

| | | |
|---|---|---|
| CN | 1658152 B | 6/2012 |
| CN | 102819520 A | 12/2012 |
| EP | 3159789 A1 | 4/2017 |

OTHER PUBLICATIONS

Chinese Patent First Office Action and Search Report in Chinese Patent Application No. 2016109224863 dated Jul. 17, 2018, 19 pages with translation.
Czajkowski, U.S. Appl. No. 14/876,160, filed Oct. 6, 2015.
EP Notice of Allowance in EP Application No. 16194534.0 dated Jun. 13, 2018, 47 pages.

(Continued)

*Primary Examiner* — Michael D. Yaary
(74) *Attorney, Agent, or Firm* — Patent Capital Group

(57) ABSTRACT

A specialized processing block on an integrated circuit includes a first and second arithmetic operator stage, an output coupled to another specialized processing block, and configurable interconnect circuitry which may be configured to route signals throughout the specialized processing block, including in and out of the first and second arithmetic operator stages. The configurable interconnect circuitry may further include multiplexer circuitry to route selected signals. The output of the specialized processing block that is coupled to another specialized processing block together with the configurable interconnect circuitry reduces the need to use resources outside the specialized processing block when implementing mathematical functions that require the use of more than one specialized processing block. An example for such mathematical functions include the implementation of scaled product sum operations and the implementation of Horner's rule.

18 Claims, 10 Drawing Sheets

(56) References Cited

U.S. PATENT DOCUMENTS

| | | |
|---|---|---|
| 7,746,109 B1 | 6/2010 | Young et al. |
| 8,266,198 B2 | 9/2012 | Lee et al. |
| 8,266,199 B2 | 9/2012 | Langhammer et al. |
| 8,301,681 B1 | 10/2012 | Lee et al. |
| 8,307,023 B1 | 11/2012 | Leung et al. |
| 9,207,908 B1 | 12/2015 | Langhammer |
| 9,507,565 B1 | 11/2016 | Streicher et al. |
| 9,600,278 B1 * | 3/2017 | Langhammer ........ G06F 9/3001 |
| 10,037,192 B2 | 7/2018 | Langhammer |
| 2005/0144212 A1 * | 6/2005 | Simkins ............. G06F 15/7867 708/490 |
| 2006/0195496 A1 * | 8/2006 | Vadi .......................... G06F 7/02 708/200 |
| 2006/0206557 A1 * | 9/2006 | Wong ........................ G06F 7/02 708/700 |
| 2012/0290819 A1 | 11/2012 | Langhammer |
| 2017/0115958 A1 | 4/2017 | Langhammer |

OTHER PUBLICATIONS

European Patent Office Extended Search Report and Written Opinion in EP Application Serial No. 16194534.0 dated Mar. 3, 2017 (8 pages).

Final Office Action in U.S. Appl. No. 14/919,429, dated Nov. 30, 2017, 8 pages.

Langhammer, U.S. Appl. No. 13/752,661, filed Jan. 29, 2013.

Notice of Allowance in U.S. Appl. No. 14/919,429, dated Apr. 3, 2018, 7 pages.

Sabyaschi Das, et al., "A Timing-Driven Synthesis Technique for Arithmetic Product-of-Sum Expressions," VLSI Design, 2008. VLSID 2208, 21st International Conference on IEEE, Piscataway, NJ, USA, Jan. 4, 2008 (pp. 635-640), XP031230108, ISBN 978-0-7695-3083-3.

Streicher et al., U.S. Appl. No. 14/180,664, filed Feb. 14, 2014.

Chinese Patent Notice of Allowance in Chinese Patent Application No. 2016109224863 dated Mar. 22, 2019, 3 pages with translation.

* cited by examiner

METHODS AND APPARATUS FOR PERFORMING PRODUCT SERIES OPERATIONS IN MULTIPLIER ACCUMULATOR BLOCKS

CROSS REFERENCE TO RELATED APPLICATIONS

This Application is a continuation (and claims the benefit of priority under 35 U.S.C. § 120) of U.S. application Ser. No. 14/919,429, filed on Oct. 21, 2015, and entitled METHODS AND APPARATUS FOR PERFORMING PRODUCT SERIES OPERATIONS IN MULTIPLIER ACCUMULATOR BLOCKS, now issued as U.S. Pat. No. 10,037,192. The disclosure of the prior application is considered part of (and is incorporated by reference in) the disclosure of this application.

BACKGROUND

This embodiments disclosed herein relate to integrated circuits and, more particularly, to a specialized processing block in an integrated circuit.

Consider a configurable device such as a programmable logic device (PLD) as one example of an integrated circuit. As applications for which configurable devices are used increase in complexity, it has become more common to include specialized processing blocks in configurable devices. Such specialized processing blocks may include a concentration of circuitry that has been partly or fully hardwired to perform one or more specific tasks, such as a logical or a mathematical operation.

A specialized processing block may also contain one or more specialized structures, such as an array of configurable memory elements. Examples of structures that are commonly implemented in such specialized processing blocks include: multipliers, arithmetic logic units (ALUs), barrel-shifters, various memory elements (such as first-in first-out (FIFO)/last-in first-out (LIFO)/serial-in parallel-out (SIPO)/random-access memory (RAM)/read-only memory (ROM)/content-addressable memory (CAM) blocks and register files), AND/NAND/OR/NOR arrays, etc., or combinations thereof.

SUMMARY

According to some embodiments, a multiplier accumulator block on an integrated circuit may include first, second, and third inputs, an output, and first and second arithmetic operator stages. The first, second, and third inputs may be directly coupled to external configurable interconnect circuitry outside of the specialized processing block. The first arithmetic operator stage (e.g., a multiplier stage) may receive signals from the first and second inputs, whereas the second arithmetic operator stage (e.g., an adder stage) may receive signals from the third input and has an output port that is coupled to the output of the multiplier accumulator block. As an example, both the first and second arithmetic operator stages operate on floating-point number inputs.

Internal configurable interconnect circuitry inside the multiplier accumulator block may include a first multiplexer that selects between signals generated from the first arithmetic operator stage and signals generated at the output port of the second arithmetic operator stage.

It is appreciated that the present invention can be implemented in numerous ways, such as a process, an apparatus, a system, a device, instructions on a computer readable medium, or any desired combination of the above. Several embodiments of the present invention are disclosed herein.

In certain embodiments, the above-mentioned internal configurable interconnect circuitry may include a second multiplexer that selects between signal generated from the first arithmetic operator stage and signals received from the second input and that routes the selected signals to the second arithmetic operator stage.

If desired, the above mentioned specialized processing block may have a fourth input and a third multiplexer. The fourth input may be directly coupled to an additional multiplier accumulator block and may route signals to both the first and second multiplexers. The third multiplexer in the internal configurable interconnect circuitry may be configured to select between signals generated from the first multiplexer and signals received from the second input and may further be configured to route the selected signals to the first arithmetic operator stage.

Further features of the present invention, its nature and various advantages, will be more apparent from the accompanying drawings and the following detailed description of the preferred embodiments.

DETAILED DESCRIPTION

Specialized processing blocks may include a concentration of circuitry that has been partially or fully hardwired to perform one or more specific tasks, such as a logical or a mathematical operation. A specialized processing block may also contain one or more specialized structures, such as an array of configurable memory elements. Examples of structures that are commonly implemented in such specialized processing blocks include: multipliers, arithmetic logic units (ALUs), barrel-shifters, various memory elements (such as FIFO/LIFO/SIPO/RAM/ROM/CAM blocks and register files), AND/NAND/OR/NOR arrays, etc., or combinations thereof.

One particularly useful type of specialized processing block that has been provided on programmable logic devices (PLDs) is a digital signal processing (DSP) block that can be used to process audio signals (as an example). Such blocks may sometimes be referred to as multiply-accumulate ("MAC") blocks, when they include structures to perform multiplication operations, sums, and/or accumulations of multiplication operations.

For example, PLDs sold by Altera Corporation, of San Jose, Calif., as part of the STRATIX® and ARRIA® families include MAC blocks, each of which includes a plurality of multipliers. Each of these MAC blocks also includes adders and registers, as well as programmable connectors (e.g., multiplexers) that allow the various components of the block to be configured in different ways.

The implementation of some applications may require more than one specialized processing block. Examples for such functions include the implementation of vector (dot product) operations or sum-of-product operations such as finite impulse response (FIR) filters, to name a few. Signals produced in a given specialized processing block and consumed in another specialized processing block may require the use of interconnect resources outside the specialized processing block. The use of such resources may not be efficient in terms of delay and power consumption. Therefore, it may be desirable to introduce direct interconnect resources between adjacent specialized processing blocks together with configurable interconnect circuitry that may route signals to and from those direct interconnect resources.

It will be obvious to one skilled in the art, that the present exemplary embodiments may be practiced without some or all of these specific details. In other instances, well-known operations have not been described in detail in order not to unnecessarily obscure the present embodiments.

Figure 1:
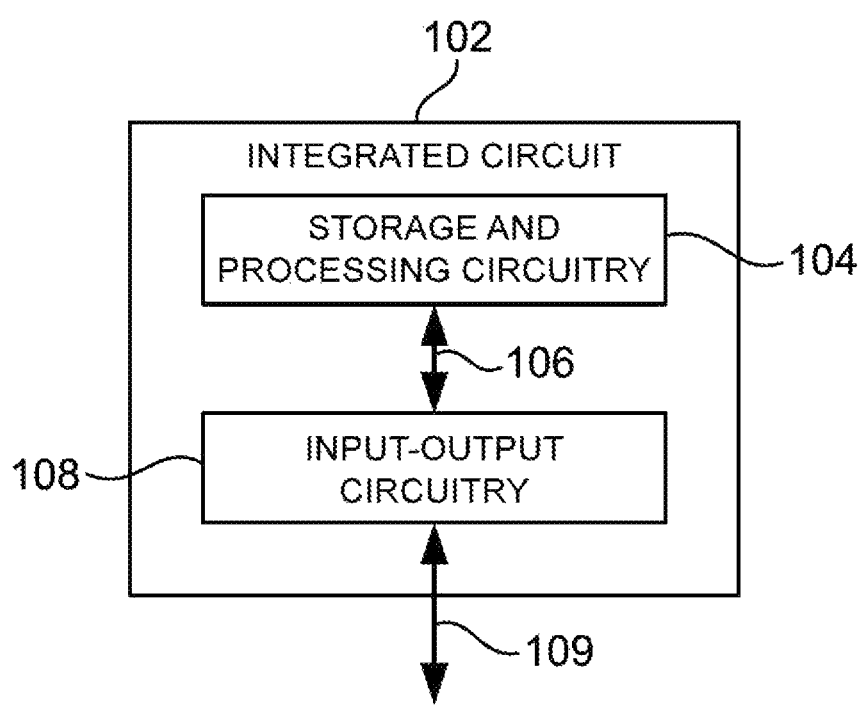
FIG. 1 is a diagram of an illustrative integrated circuit in accordance with an embodiment.

An illustrative embodiment of an integrated circuit 102 is shown in FIG. 1. Integrated circuit 102 may include storage and processing circuitry 104 and input-output circuitry 108. Storage and processing circuitry 104 may include embedded microprocessors, digital signal processors (DSP), microcontrollers, specialized processing blocks, arithmetic processing circuits, or other processing circuitry. The storage and processing circuitry 104 may further have random-access memory (RAM), first-in first-out (FIFO) circuitry, stack or last-in first-out (LIFO) circuitry, read-only memory (ROM), content-addressable memory (CAM), or other memory elements.

Input/output circuitry may include parallel input/output circuitry, differential input/output circuitry, serial data transceiver circuitry, or other input/output circuitry suitable to transmit and receive data. Internal interconnection resources 106 such as conductive lines and busses may be used to send data from one component to another component or to broadcast data from one component to one or more other components.

Internal interconnection resources 106 may also include network-on-chip (NoC) or other on chip interconnection resources. External interconnection resources 109 such as conductive lines and busses, optical interconnect infrastructure, or wired and wireless networks with optional intermediate switches may be used to communicate with other devices.

Figure 2:
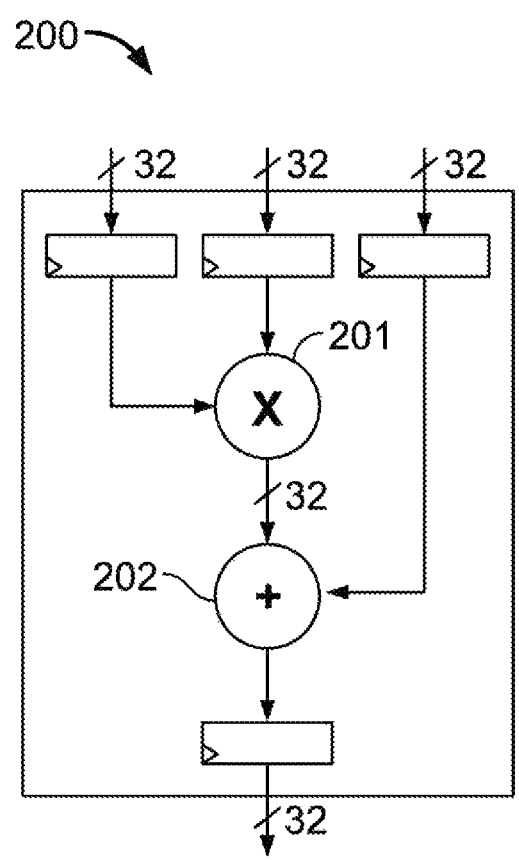
FIG. 2 is a logical diagram of an illustrative specialized processing block in accordance with an embodiment.

An illustrative system FIG. 2 shows a logical diagram of an exemplary specialized processing block such as a multiplier accumulator (MAC) block 200 that may be included in storage and processing circuitry 104 of FIG. 1 according to an embodiment. In this logical representation, implementation details, such as registers and some programmable routing features—such as multiplexers that may allow the output of a particular structure to be routed directly out of MAC block 200—are omitted to simplify discussion. In addition, some elements that are shown may, in an actual embodiment, be implemented more than once. For example, the multiplier 201 may actually represent two or more multipliers, as in the MAC blocks of the aforementioned STRATIX® and ARRIA® families of PLDs.

In the logical representation of FIG. 2, the adder stage 202 follows a multiplier stage 201. The multiplier stage may implement a fixed-point multiplier or a floating-point multiplier. A floating-point multiplier may be constructed from a 27×27 fixed-point multiplier and some additional logic. The additional logic may calculate exponents, as well as special and error conditions such as NAN (not-a-number), Zero and Infinity. Optionally, other logic may be provided to round the result of the multiplier to IEEE754 format. Such rounding can be implemented as part of the final adder within the multiplier structure (not shown), or in programmable logic outside MAC block 200 when the output of the multiplier 201 is outputted directly from MAC block 200.

The multiplier stage 201 may feed the adder stage 202 directly in a multiplier-add (MADD) mode, as depicted in FIG. 2. Adder stage 202 may implement a fixed-point adder or a floating-point adder.

Figure 3:
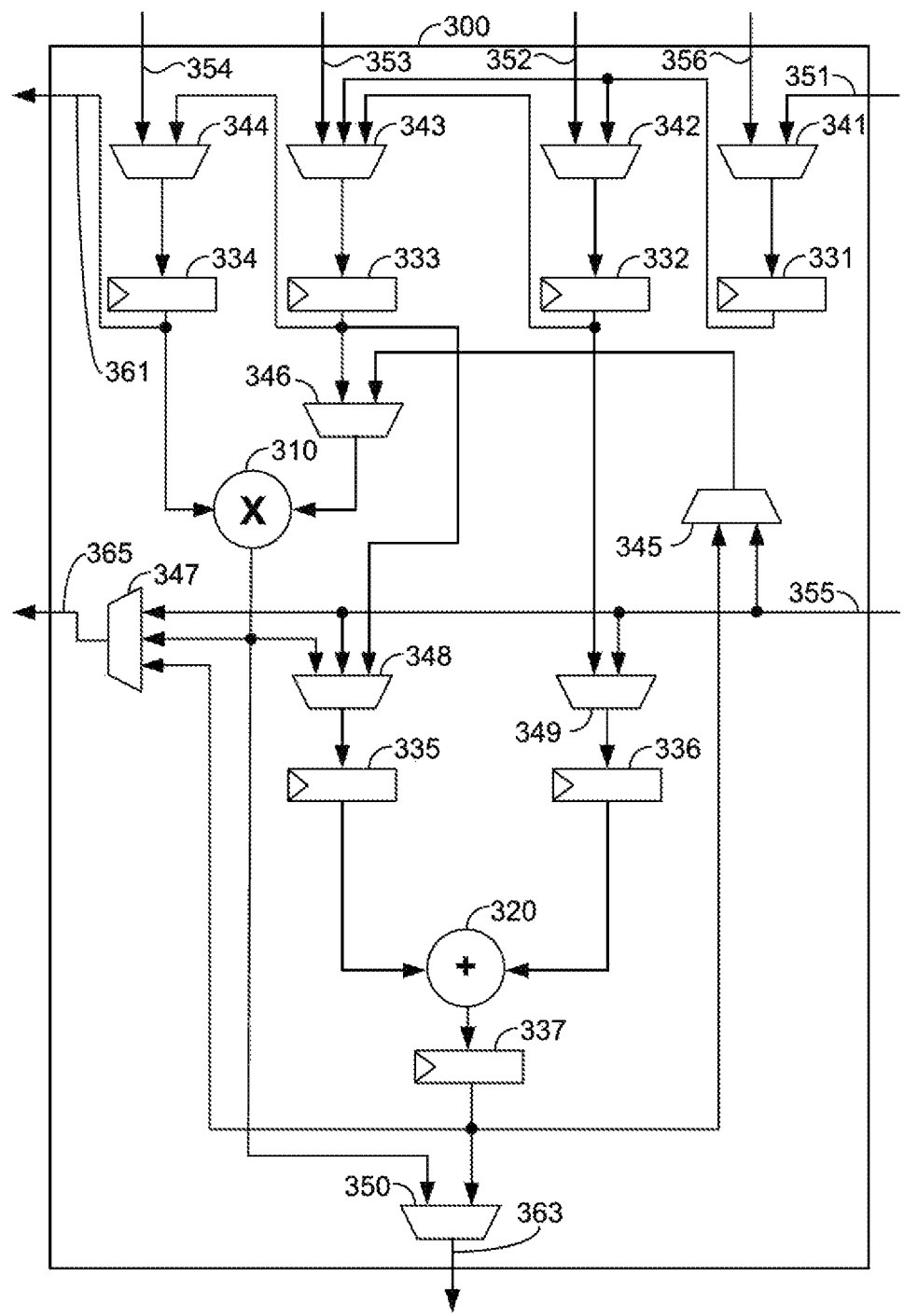
FIG. 3 is a more detailed diagram of an illustrative specialized processing block in accordance with an embodiment.

FIG. 3 shows a more detailed diagram of an exemplary specialized processing block 300 according to an embodiment. Specialized processing block 300 may have inputs 352, 353, and 354 coupled to external configurable interconnect resources. Specialized processing block 300 may also have inputs 355 and 351 that are directly coupled to an adjacent specialized processing block 300.

Similarly, specialized processing block 300 may have output 363 that is coupled to external configurable interconnect resources and outputs 361 and 365 that are directly coupled to inputs 351 and 355, respectively, of another adjacent similar specialized processing block 300. Except at the ends of a chain of specialized processing blocks 300, there are direct connections between input 355 and output 365 and between input 351 and output 361.

As an example, specialized processing block 300 may handle 32-bit wide signals, such as single precision floating-point numbers as defined by standard IEEE754. If desired, specialized processing block 300 may handle any bit width. For example, specialized processing block 300 may handle double precision floating-point numbers (i.e., 64-bit wide signals), quadruple precision floating-point numbers (i.e., 128-bit wide signals), half precision floating-point numbers (i.e., 16-bit wide signals), to name a few.

Accordingly, the number of registers and multiplexers in specialized processing block 300 may be adapted to the bit width of the incoming signals. For example, if all input signals are 32-bit wide, each register (i.e., registers 331 to 337) may actually have 32 1-bit registers. Similarly, each two-to-one multiplexer (i.e., multiplexers 341, 342, 344, 345, 346, 349, and 350) may actually have 32 two-to-one multiplexers, and each three-to-one multiplexer (i.e., multiplexers 343, 347, and 348) may actually have 32 three-to-one multiplexers. For example, each of the 32 two-to-one multiplexers that constitute multiplexer 344 may receive one bit from the signal received at input 354 and one bit from register 333. All 32 two-to-one multiplexers of multiplexer 344 may share the same control signal such that either all signals received from input 354 are selected or all signals received from register 333 are selected.

If desired, registers 331 to 337 may be optionally bypassed (not shown). For example, a multiplexer may receive the input signal and the output signal of a register. The multiplexer may select the input signal of the register to bypass the register and the output signal of the register to perform pipelining.

In some embodiments, specialized processing block 300 may include additional pipelining (not shown). As an example, specialized processing block 300 may have an optionally bypassable register stage between the multiplier stage and output 363 and/or 365, between input 355 and output 365, between input 355 and multiplier stage 310, etc. Optionally bypassable pipelining (not shown) may also be provided within either or both of the multiplier stage 310 and the adder stage 320.

Specialized processing block 300 may have multiplexers 341 to 344 to select between inputs. For example, multiplexer 341 may select between signals received from input 356 and input 351, multiplexer 342 may select between signals received from input 352 and the output of register 331, multiplexer 343 may select between signals received from input 353, register 332, and register 331, and multiplexer 344 may select between signals received from input 354 and register 333.

Configurable interconnect resources may route signals to multiplier stage 310 from multiple sources, including inputs 351, 352, 353, 354, 355, and 356 and the output of adder stage 320. Configurable interconnect resources may route signals to adder stage 320 from multiple sources, including inputs 351, 352, 353, 355, and 356, and the output of multiplier stage 310.

In some embodiments, the output of multiplier stage 310, input 355, or the output of adder stage 320 may be routed via multiplexer 347, output 365, and a direct connection to input 355 of an adjacent similar specialized processing block 300 and from there to the adder stage of the adjacent similar specialized processing block via multiplexers 348 and/or 349 and/or to the multiplier stage of the adjacent similar specialized processing block via multiplexers 345 and 346.

Specifically, multiplexer 349 may be configured to select between signals received at inputs 351 or 352 and signals received at input 355. Similarly, multiplexer 348 may be provided to select between signals received at input 353, at input 355, and from the output of multiplier stage 310 as another input to adder stage 320. Thus, adder stage 320 may receive signals from two inputs (i.e., input 352 and 353) that are both coupled to external configurable interconnect resources, and the paths from these inputs both bypass multiplier stage 310.

Specialized processing block 300 may be configured in various different ways to implement a wide variety of functions. For example, specialized processing block 300 may be configured to implement a shift register, a multiplier, a multiply-add function, a multiply-accumulate function, a scaled product, a scaled product sum, a scaled product difference, just to name a few.

Consider the scenario in which specialized processing block 300 is used as a shift register. In this scenario, data may enter specialized processing block 300 at input 352 and may be stored in register 332. From there, the data may be routed through multiplexer 343 to register 333 and from there through multiplexer 344 and bypassing register 334 to output 361. Either the output of registers 332 or 333 may be tapped but not both at the same time. For example, the output of register 332 may be tapped by providing zero on input 354 thereby producing a zero at the output of the multiplier. Multiplexer 348 may be configured to select the multiplier output as the first input to adder stage 320. Multiplexer 349 may be selected to choose the output of register 332 as the second input to the adder stage. Routing the output of the adder stage to output 363 may provide the output of register 332 at output 363. The output of register 334 may be tapped by providing the value '1' on input 354. Multiplying the output of register 333 with '1' yields the output of register 333 at the output of the multiplier stage 310. Multiplexer 350 may be configured such that the multiplier output bypasses adder stage 320 thereby providing the output of register 333 to output 363.

Multiple specialized processing blocks according to embodiments may be arranged in a row or column, so that information can be fed from one block to the next using the aforementioned direct connections between output 365 and input 355 and between output 361 and input 351, to create more complex structures.

Figure 4:
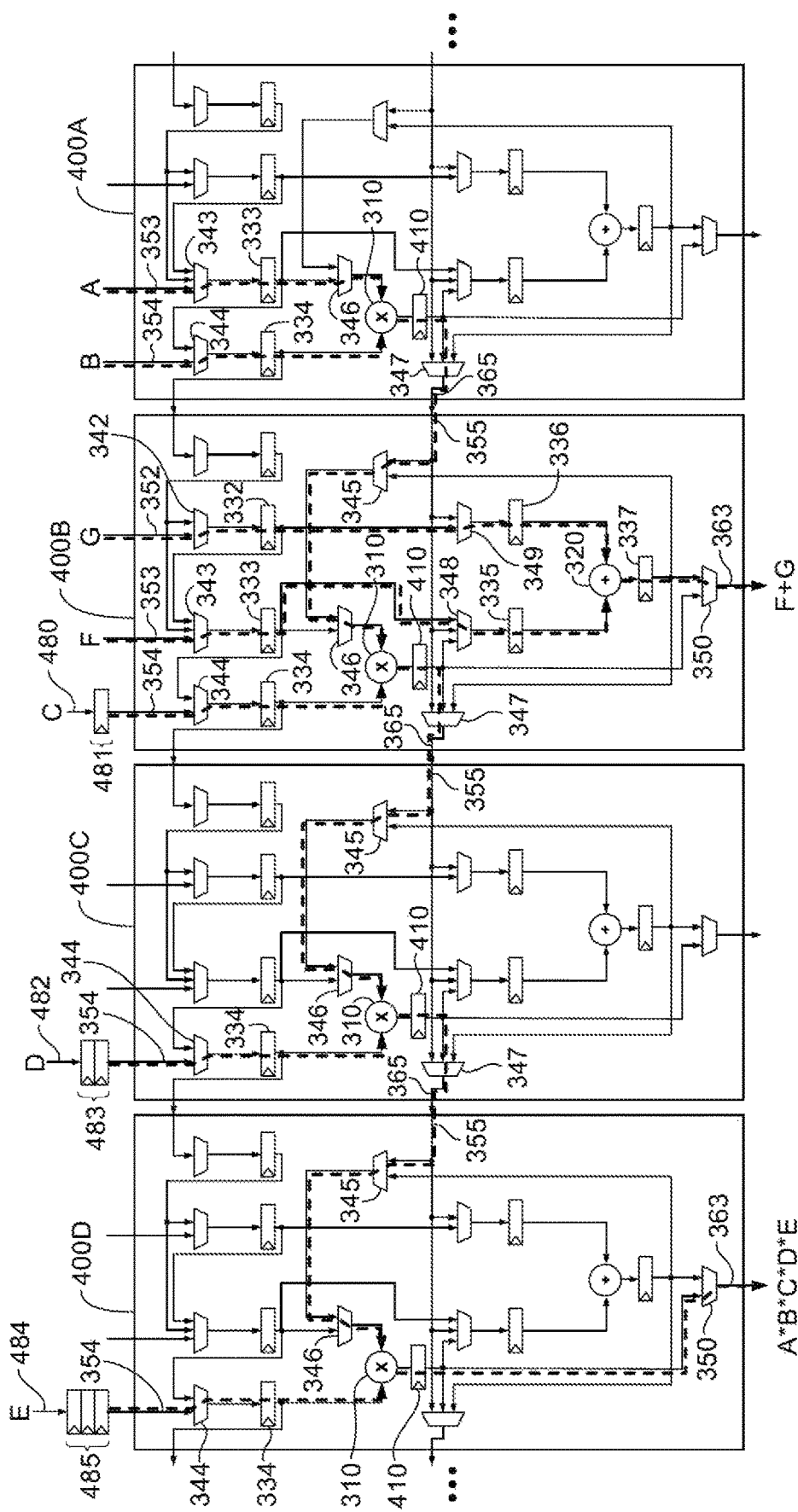
FIG. 4 is a diagram of an illustrative arrangement of specialized processing blocks with an exemplary selection of data paths that performs a sequential scaled product in accordance with an embodiment.

FIG. 4 shows a row of four specialized processing blocks 400A, 400B, 400C, and 400D (e.g., a chain of multiplier accumulator blocks 400) according to an embodiment configured to perform a sequential scaled product operation. Alternatively, the specialized processing blocks 400 in that configuration could be arranged in a column. In the column arrangement, each MAC block 400 may be rotated 90 degrees without having to reroute the inputs and the outputs or alternatively, if blocks 400 are not rotated, configurable routing fabric (sometimes referred to as "soft" routing circuitry) outside of blocks 400 may be used to interconnect the series of blocks 400. As shown, specialized processing blocks 400A, 400B, 400C, and 400D may each be implemented by specialized processing block 300 with an additional register such as register 410 coupled to the output of multiplier stage 310.

A product of a sequence, which is sometimes also referred to as a scaled product is defined as the product $$y = \Pi_{i=0}^{n} x_i \qquad (1)$$

In the example of FIG. 4, the sequence of values to be multiplied may be X=(A, B, C, D, E). Specialized processing block 400A may receive signals A and B at inputs 353 and 354, while specialized processing blocks 400B, 400C, and 400D receive inputs C, D, and E at input 354, respectively.

Configurable interconnect resources in specialized processing block 400A may route signals A and B from inputs 353 and 354 to multiplier stage 310, which may compute the product of A*B.

Similarly, configurable interconnect resources in specialized processing blocks 400B, 400C, and 400D may route each of signals C, D, and E from the respective input 354 to the respective multiplier stage 310. Each of signals C, D, and E may be multiplied with a previous cumulative result produced in an adjacent specialized processing block to the right. For example, multiplier stage 310 of specialized processing block 400B may multiply C with the result produced in specialized processing block 400A. Configurable interconnect circuitry in the adjacent specialized processing block to the right (e.g., in specialized processing block 400A) may route the result from multiplier stage 310 through multiplexer 347 and output 365 to input 355 of the current specialized processing block (e.g., specialized processing block 400B). Configurable interconnect circuitry in the current specialized processing block (e.g., specialized processing block 400B) may route the result of the previous computation (e.g., A*B) received at input 355 through multiplexers 345 and 346 to the multiplier stage 310.

Since intermediate results from adjacent specialized processing blocks to the right are delayed by one pipelining stage, an additional pipelining stage is required for every specialized processing block left of the rightmost specialized processing block 400A (i.e., signal C at input 480 may be delayed by one pipeline stage 481, signal D at input 482 may be delayed by two pipeline stages 483, and signal E at input 484 of specialized processing block 400D may be delayed by three pipelining stages 485). In one embodiment, these pipelining stages may be implemented using resources external to the specialized processing blocks.

The multiplier stage in the leftmost specialized processing block (e.g., multiplier stage 310 of specialized processing block 400D) may compute the final result of the scaled product (i.e., the product of the sequence A*B*C*D*E). Configurable interconnect circuitry in the leftmost specialized processing block may route the result from multiplier stage 310 through register 410 and multiplexer 350 to output 363.

An exemplary selection of data paths by multiplexers 343, 344, 345, 346, 347, and 350 is shown with dotted lines in FIG. 4.

As shown, some of the resources of specialized processing blocks 400A, 400B, 400C, and 400D may remain unused. If desired, other arithmetic operations may be executed by those unused resources. For example, specialized processing block 400B or 400C may perform the addition of two independent numbers. As shown in FIG. 4, specialized processing block 400B may receive signals F and G at inputs 353 and 352. Configurable interconnect resources may route signal F through multiplexer 343, register 333, multiplexer 348, and register 335 to adder stage 320 and signal G through multiplexer 342, register 332, multiplexer 349, and register 336 to adder stage 320. Adder stage 320 may compute the sum of F and G, and the configurable interconnect resources may route the sum F+G through register 337 and multiplexer 350 to output 363.

If desired, other arithmetic operations may be performed in specialized processing blocks 400A, 400B, 400C, and 400D. As another example, specialized processing block 400A may compute the sum of a first signal received at input 352 and a second signal received at input 355 from an adjacent specialized processing block and provide the result at output 363. In this example, configurable interconnect resources may route the first signal through multiplexer 342, register 332, multiplexer 349, and register 336 to adder stage 320 and the second signal through multiplexer 348 and register 335 to adder stage 320. Adder stage 320 may compute the sum of the first and second signals, and the configurable interconnect resources may route the sum through register 337 and multiplexer 350 to output 363.

As another example, specialized processing block 400D may compute the sum of a first signal received at input 352 and a second signal received at input 353 and provide the result at output 365. In this example, configurable interconnect resources may route the first signal through multiplexer 342, register 332, multiplexer 349, and register 336 to adder stage 320 and the second signal through multiplexer 343, register 333, multiplexer 348, and register 335 to adder stage 320. Adder stage 320 may compute the sum of the first and second signals, and the configurable interconnect resources may route the sum through register 337 and multiplexer 347 to output 365.

Figure 5:
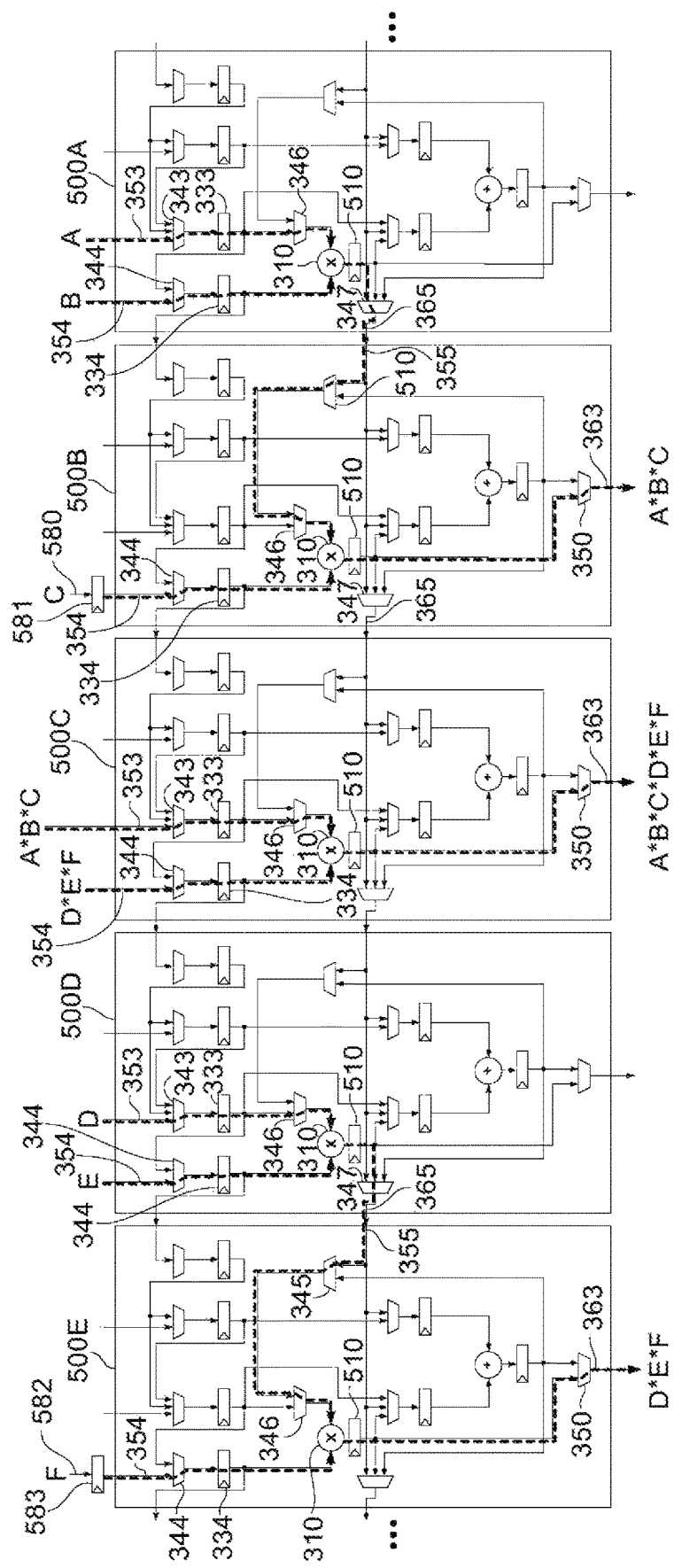
FIG. 5 is a diagram of an illustrative arrangement of specialized processing blocks with an exemplary selection of data paths that performs a mixed recursive and sequential scaled product in accordance with an embodiment.

FIG. 5 shows a row of five specialized processing blocks 500A, 500B, 500C, 500D, and 500E according to an embodiment configured to perform two sequential scaled product operations followed by a recursive scaled product operation. As shown, specialized processing block 500A, 500B, 500C, 500D, and 500E may each be implemented by specialized processing block 300 with an additional register such as register 510 coupled to the output of multiplier stage 310.

In the example of FIG. 5, the sequence of values to be multiplied may be X1=(A, B, C) and X2=(D, E, F). Specialized processing blocks 500A and 500B may receive signals A, B, and C and compute the product A*B*C in the same way as illustrated in FIG. 4 with the difference that the configurable interconnect resources of specialized processing block 500B may route the product A*B*C to output 363 (instead of routing A*B*C to output 365 of specialized processing block 400B in FIG. 4). In this example, signal C at input 580 may be delayed by one pipelining stage 581 to help synchronize the input signals among blocks 500.

Similarly, specialized processing blocks 500D and 500E may receive signals D, E, and F and compute the product D*E*F in the same way as specialized processing blocks 500A and 500B compute A*B*C. In particular, signal F at input 582 may be delayed by one pipelining stage 583 to help with input synchronization among blocks 500. Configurable interconnect resources of specialized processing block 500E may route the product D*E*F to output 363.

Configurable interconnect resources outside of the specialized processing blocks 500A, 500B, 500C, 500D, and 500E may route the product A*B*C from output 363 of specialized processing block 500B to input 353 of specialized processing block 500C and the product D*E*F from output 363 of specialized processing block 500E to input 354 of specialized processing block 500C.

Configurable interconnect circuitry in specialized processing block 500C may route signal A*B*C from input 353 through multiplexer 343, register 333, and multiplexer 346 to multiplier stage 310 and signal D*E*F from input 354 through multiplexer 344 and register 334 to multiplier stage 310. Multiplier stage 310 may compute the product A*B*C*D*E*F, and configurable interconnect circuitry may route the product through register 510 and multiplexer 350 to output 363 of specialized processing block 500C. An exemplary selection of data paths by multiplexers 343, 344, 345, 346, 347, and 350 is shown with dotted lines in FIG. 5.

Similarly to what is shown above in FIG. 4, unused resources in specialized processing blocks 500A, 500B, 500C, 500D, and 500E may be used for performing additional arithmetic operations, if desired.

Figure 6:
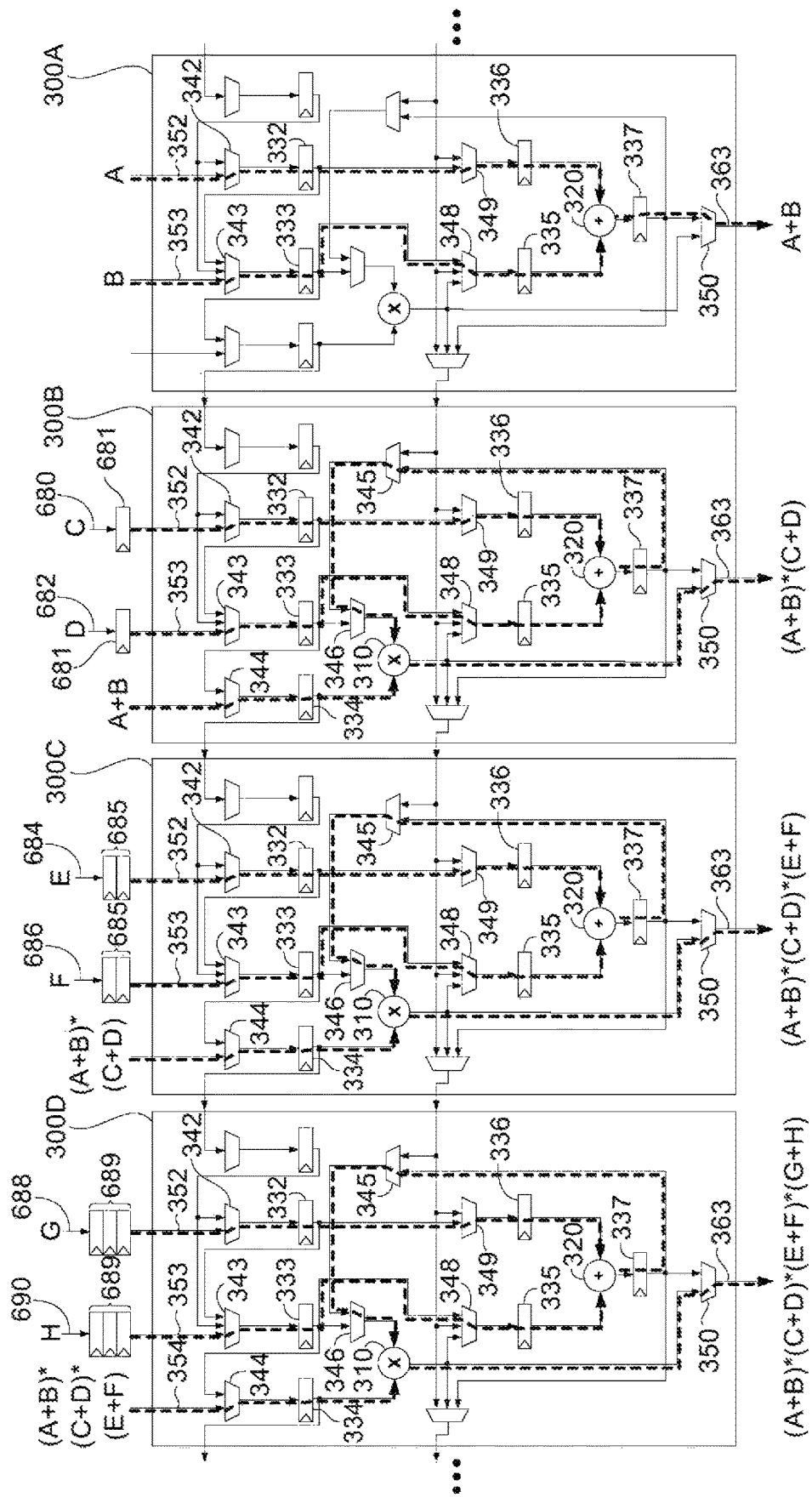
FIG. 6 is a diagram of an illustrative arrangement of specialized processing blocks with an exemplary selection of data paths that performs a sequential product of sums in accordance with an embodiment.

FIG. 6 shows a row of four specialized processing blocks 300A, 300B, 300C, and 300D according to an embodiment configured to perform a sequential scaled product of sums operation, a sequential scaled product of differences operation, or a sequential scaled product of add/sub operations. As shown, specialized processing blocks 300A, 300B, 300C, and 300D may each be implemented by MAC block 300, wherein adder stage 320 may be configured to perform an addition or a subtraction. Thus, each block of specialized processing blocks 300A, 300B, 300C, and 300D may perform either an addition or a subtraction.

A product of a sequence of sums, which is sometimes also referred to as a scaled product of sums is defined as the product $$y = \Pi_{i=0}^{n}(x\_i + z\_i) \qquad (2)$$

A product of a sequence of differences, which is sometimes also referred to as a scaled product of differences is defined as the product $$y = \Pi_{i=0}^{n}(x\_i - z\_i) \quad (3)$$

In the example of FIG. 6, the sequence of values to be multiplied may be X=(A, C, E, G) and Z=(B, D, F, H). Specialized processing block 300A may receive signals A and B at inputs 352 and 353, while specialized processing blocks 300B, 300C, and 300D receive inputs C and D, E and F, and G and H at inputs 352 and 353, respectively.

Configurable interconnect resources in specialized processing block 300A may route signals A and B from inputs 352 and 353 to adder stage 320, which may compute the sum of A+B.

Similarly, configurable interconnect resources in specialized processing blocks 300B, 300C, and 300D may route each of signals C, E, and G from the respective input 352 to the respective adder stage 320 and each of signals D, F, and H from the respective input 353 to the respective adder stage 320. Each of the respective adder stages 320 may compute the sum (or the difference) of the received signals. In other words, adders stages 320 of specialized processing blocks 300A, 300B, 300C, and 300D may compute the sum A+B, C+D, E+F, and G+H (or the difference A−B, C−D, E−F, and G−H), respectively.

The configurable interconnect resources in the rightmost specialized processing block (e.g., specialized processing block 300A) may route the sum (or difference) to output 363, while the configurable interconnect resources in the other specialized processing blocks (e.g., specialized processing blocks 300B, 300C, and 300D) may route the sum (or difference) through multiplexers 345 and 346 to multiplier block 310 of the respective specialized processing block.

Configurable interconnect resources external to the specialized processing blocks may couple the respective outputs 363 of all but the leftmost specialized processing block (e.g., outputs 363 of specialized processing blocks 300A, 300B, and 300C) to the respective inputs 354 of the adjacent specialized processing block to the left (e.g., inputs 354 of specialized processing blocks 300B, 300C, and 300D). As an example, output 363 of specialized processing block 300A may be coupled through configurable interconnect resources external to the specialized processing blocks to input 354 of specialized processing block 300B. As another example, output 363 of specialized processing block 300B may be coupled through configurable interconnect resources external to the specialized processing blocks to input 354 of specialized processing block 300C.

Configurable interconnect circuitry in all but the rightmost specialized processing block (e.g., specialized processing block 300B) may route the result of the previous computation (e.g., A+B) received at input 354 through multiplexer 344 and register 334 to the multiplier stage 310.

Since intermediate results from adjacent specialized processing blocks to the right that are received at inputs 354 are delayed by one pipelining step, an additional pipelining stage is required for every specialized processing block left of the rightmost specialized processing block 300A (i.e., signals C and D at inputs 680 and 682 of MAC block 300B may each be delayed by one pipeline stage 681, signals E and F at inputs 684 and 686 of MAC block 300C may each be delayed by two pipeline stages 685, and signals G and H at inputs 688 and 690 of MAC block 300D may each be delayed by three pipelining stages 689). In one embodiment, these pipelining stages may be implemented using reconfigurable resources external to the specialized processing blocks.

The multiplier stage in all but the rightmost specialized processing block (e.g., multiplier stages 310 of specialized processing blocks 300B, 300C, and 300D) may compute a product of sums based on the signal received from input 354 and the signal received from adder stage 320. Configurable interconnect circuitry in the respective specialized processing block may route the product of sums from multiplier stage 310 through multiplexer 350 to output 363.

An exemplary selection of data paths by multiplexers 342, 343, 344, 345, 346, 348, 349, and 350 is shown with dotted lines in FIG. 6. A product of differences may be computed with the same selection of data paths by configuring all adder stages 320 in specialized processing blocks 300A, 300B, 300C, and 300D to perform subtractions. A product of mixed additions and subtractions may be performed with the same selection of data paths by individually configuring adder stages 320 in each of specialized processing blocks 300A, 300B, 300C, and 300D to perform either additions or subtractions.

Figure 7:
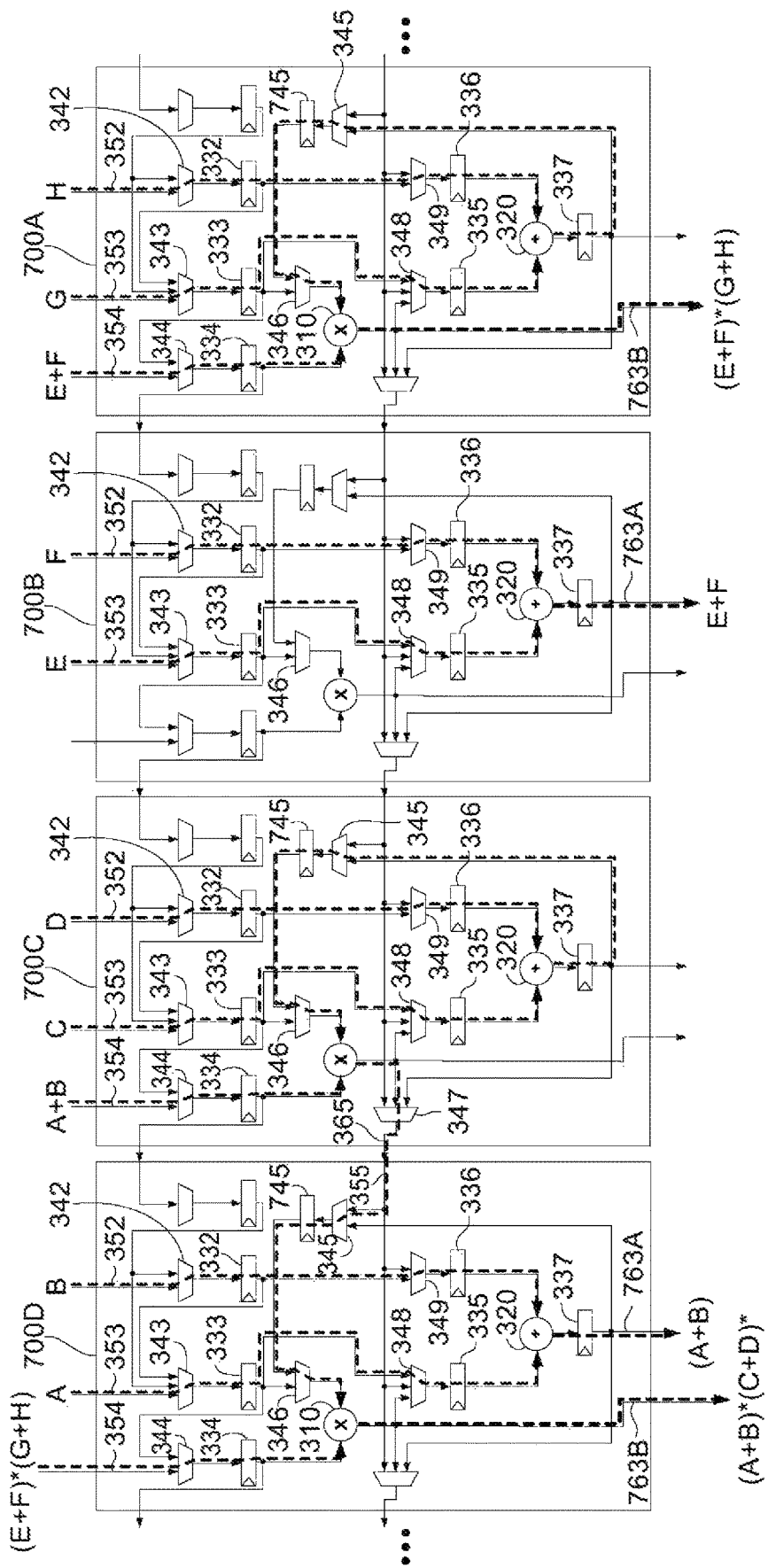
FIG. 7 is a diagram of an illustrative arrangement of specialized processing blocks with an exemplary selection of data paths that performs a recursive scaled product of sums in accordance with an embodiment.

FIG. 7 shows a row of four specialized processing blocks 700A, 700B, 700C, and 700D according to an embodiment configured to perform a recursive scaled product of sums operation, a recursive scaled product of differences operation, or a recursive scaled product of add/sub operations. As shown, specialized processing blocks 700A, 700B, 700C, and 700D may each be implemented by specialized processing block 300 with additional register 745 coupled between multiplexer 345 and multiplexer 346, output 363 split into outputs 763A and 763B where output 763A is coupled to adder stage 320 and output 763B to multiplier stage 310, and where adder stage 320 may be configured to perform an addition or a subtraction. Thus, each block of specialized processing blocks 700A, 700B, 700C, and 700D may perform either an addition or a subtraction.

In the example of FIG. 7, the sequence of values to be multiplied may be X=(A, C, E, G) and Z=(B, D, F, H). Specialized processing block 700A may receive signals G and H at inputs 353 and 352, while specialized processing blocks 700B, 700C, and 700D receive inputs E and F, C and D, and A and B at inputs 353 and 352, respectively.

Configurable interconnect resources in specialized processing blocks 700A, 700B, 700C, and 700D may route each of signals A, C, E, and G from the respective input 353 to the respective adder stage 320 and each of signals B, D, F, and H from the respective input 352 to the respective adder stage 320. Each of the respective adder stages 320 may compute the sum (or the difference) of the received signals. In other words, adders stages 320 of specialized processing blocks 700D, 700C, 700B, and 700A may compute the sum A+B, C+D, E+F, and G+H (or the difference A−B, C−D, E−F, and G−H), respectively.

The configurable interconnect resources in the specialized processing blocks 700D and 700B may route the sum (or difference) to output 763A, while the configurable interconnect resources in specialized processing blocks 700A and 700C may route the sum (or difference) through multiplexer 345, register 745, and multiplexer 346 to multiplier block 310 of the respective specialized processing block.

Configurable interconnect resources external to the specialized processing blocks may couple the respective outputs 763A of specialized processing blocks 700D and 700B to the respective inputs 354 of the adjacent specialized processing block to the right. In other words, output 763A of specialized processing block 700D may be coupled through configurable interconnect resources external to the specialized processing blocks to input 354 of specialized processing block 700C, and output 763A of specialized processing block 700B may be coupled through configurable interconnect resources external to the specialized processing blocks to input 354 of specialized processing block 700A.

Configurable interconnect circuitry in specialized processing blocks 700C and 700A may route the result of the previous computation (e.g., A+B and E+F) received at respective inputs 354 through multiplexer 344 and register 334 to the multiplier stage 310.

Multiplier stages 310 of specialized processing blocks 700A and 700C may compute a product of sums based on the signal received from input 354 and the signal received from adder stage 320. Thus, multiplier stage 310 of specialized processing block 700C may compute (A+B)*(C+D), while multiplier stage 310 of specialized processing block 700A computes (E+F)*(G+H).

Configurable interconnect circuitry in specialized processing block 700A may route the product of sums (i.e., (E+F)*(G+H)) from multiplier stage 310 to output 763B. Configurable interconnect resources external to the specialized processing blocks may couple the output 763B of specialized processing block 700A to input 354 of specialized processing block 700D.

Configurable interconnect circuitry in specialized processing block 700C may route the product of sums (i.e., (A+B)*(C+D)) from multiplier stage 310 through multiplexer 347 to output 365 from where the signal reaches input 355 of adjacent specialized processing block 700D via a direct connection. Configurable interconnect circuitry in specialized processing block 700D may route the signal received at input 355 (i.e., (A+B)*(C+D)) through multiplexer 345, register 745, and multiplexer 346 to multiplier stage 310 and the signal received at input 354 (i.e., (E+F)*(G+H)) through multiplexer 344 and register 334 to multiplier stage 340.

Multiplier stage 310 may compute the product of the two signals (i.e., (A+B)*(C+D)*(E+F)*(G+H)), and provide the result at output 763B of specialized processing block 700D.

An exemplary selection of data paths by multiplexers 342, 343, 344, 345, 346, 347, 348, and 349 is shown with dotted lines in FIG. 7. A product of differences may be computed with the same selection of data paths by configuring all adder stages 320 in specialized processing blocks 700A, 700B, 700C, and 700D to perform subtractions. A product of mixed additions and subtractions may be performed with the same selection of data paths by individually configuring adder stages 320 in each of specialized processing blocks 700A, 700B, 700C, and 700D to perform either additions or subtractions.

Figure 8:
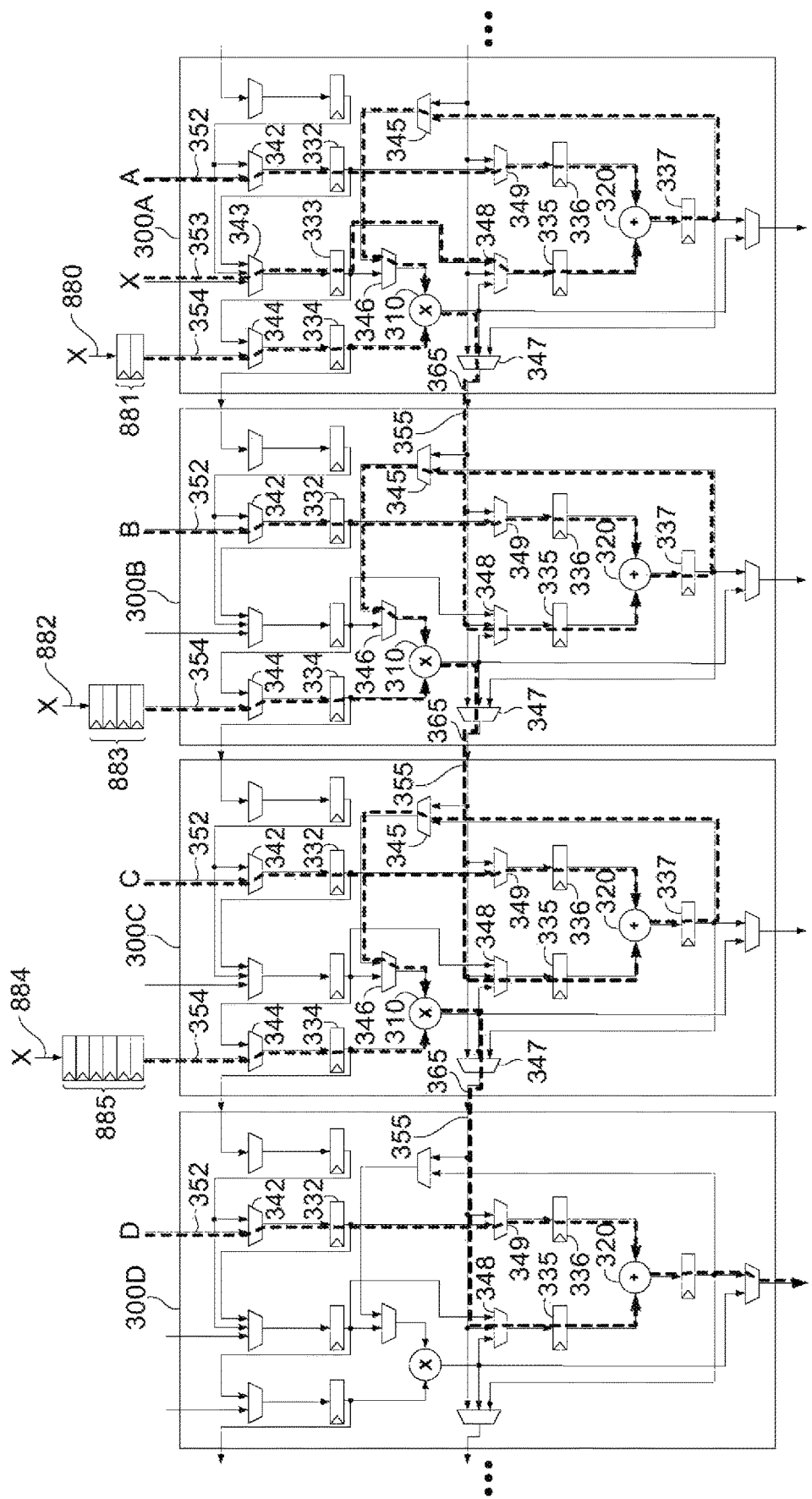
FIG. 8 is a diagram of an illustrative arrangement of specialized processing blocks with an exemplary selection of data paths that implements Horner's rule in accordance with an embodiment.

FIG. 8 is a diagram of an illustrative arrangement of four specialized processing blocks 300A, 300B, 300C, and 300D with an exemplary selection of data paths that implements Horner's rule in accordance with an embodiment. As shown, specialized processing blocks 300A, 300B, 300C, and 300D may each be implemented by specialized processing block 300.

Polynomial evaluation by Horner's rule is a commonly used function in computing. The polynomial $$y = x^4 + Ax^3 + Bx^2 + Cx + D \quad (4)$$

can be written as $$y = ((((x+A)x+B)x+C)x+D) \quad (5)$$

In the example of FIG. 8, every specialized processing block may compute a portion of the equation. For example, specialized processing block 300A may receive signals A and X at inputs 352 and 353 and another instance of signal X at input 354. Specialized processing blocks 300B, 300C, and 300D may receive signals B, C, and D at inputs 352, respectively, and specialized processing block 300B and 300C may receive another instance of signal X at inputs 354, respectively.

Since intermediate results from prior operations (e.g., the addition of signal A and X in adder stage 320 of specialized processing block 300A) are delayed by two pipelining steps relative to the instances of signal X received at inputs 354, two additional pipelining stages are required for every instance of signal X received at inputs 354. For example, the instance of signal X received at inputs 354 of specialized processing blocks 300A, 300B, and 300C may be delayed by two, four, and six additional pipelining stages, respectively (i.e., signal X received at input 880 of MAC block 300A may be delayed by two pipeline stages 881; signal X received at input 882 of MAC block 300B may be delayed by four pipeline stages 883; and signal C received at input 884 may be delayed by six pipeline stages 885). In one embodiment, these additional pipelining stages may be implemented using resources external to the specialized processing blocks.

Configurable interconnect resources in the rightmost specialized processing block (e.g., in specialized processing block 300A) may route signals A and X from inputs 352 and 353 to adder stage 320, which may compute the sum A+X.

Configurable interconnect circuitry in all but the leftmost specialized processing block (e.g., in specialized processing block 300D) may route the computed sum (e.g., A+X in specialized processing block 300A or ((A+X)X+B) in specialized processing block 300B) from adder stage 320 through multiplexers 345 and 346 to the multiplier stage 310 of the respective specialized processing block.

Similarly, configurable interconnect resources in all but the leftmost specialized processing block (e.g., in specialized processing blocks 300A, 300B, and 300C) may route the instances of signals X received at inputs 354 from the respective inputs 354 through multiplexer 344 and register 334 to the respective multiplier stages 310, which may compute the product of the signals received from adder stage 320 and the instances of the signal X. For example, multiplier stage 310 of specialized processing block 300A may compute the product (A+X)*X. As another example, multiplier stage 310 of specialized processing block 300B may compute the product ((A+X)*X+B)*X.

Configurable interconnect resources in all but the leftmost specialized processing block (e.g., in specialized processing blocks 300A, 300B, and 300C) may route the product computed by multiplier stage 320 from the multiplier stage through multiplexer 347 to output 365, from where the product is sent over a direct connection to input 355 of the adjacent specialized processing block. For example, the product (A+X)*X may be routed from multiplier stage 310 of specialized processing block 300A through multiplexer 347 to output 365 and from there directly to input 355 of specialized processing block 300B.

Configurable interconnect resources in all but the rightmost specialized processing block (e.g., in specialized processing blocks 300B, 300C, and 300D) may route the signal received at input 355 (e.g., the output of multiplier stage 310 of the adjacent specialized processing block) from input 355 through multiplexer 348 and register 335 to adder stage 320.

Each of the respective adder stages 320 may compute the sum of the received signals. In other words, adders stages 320 of specialized processing blocks 300A, 300B, 300C, and 300D may compute the sum X+A, (X+A)X+B, ((X+A)*X+B)*X+C, and (((X+A)*X+B)*X+C)*X+D, respectively.

The configurable interconnect resources in the leftmost specialized processing block (e.g., in specialized processing block 300D) may route the sum from adder stage 320 to output 363.

An exemplary selection of data paths by multiplexers 342, 343, 344, 345, 346, 347, 348, 349, and 350 is shown with dotted lines in FIG. 8.

Figure 9:
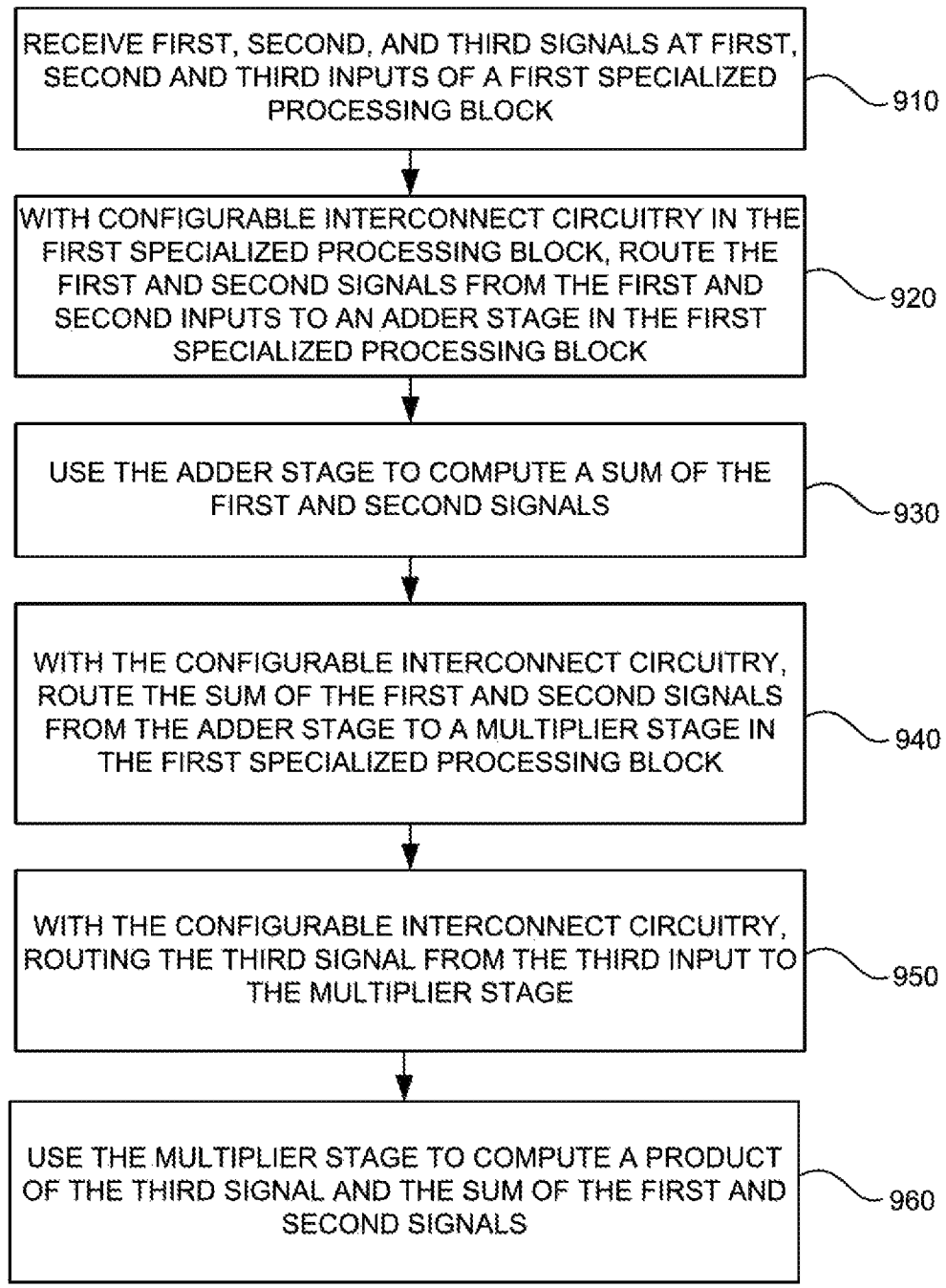
FIG. 9 is a flow chart of illustrative steps for performing a scaled product sum operation in accordance with an embodiment.

FIG. 9 is a flow chart of illustrative steps for performing a scaled product sum operation in accordance with an embodiment. During step 910, first, second, and third inputs of a first specialized processing block may receive first, second, and third signals. For example, specialized processing block 700C of FIG. 7 may receive signals D, C, and (A+B) at inputs 352, 353, and 354, respectively.

During step 920, configurable interconnect circuitry in the first specialized processing block may route the first and second signals from the first and second inputs to an adder stage in the first specialized processing block. For example, configurable interconnect circuitry that may include multiplexers 342, 343, 348, and 349 in specialized processing block 700C of FIG. 7 may route signals D and C from inputs 352 and 353 to adder stage 320 of specialized processing block 700C.

During step 930, the adder may compute a sum of the first and second signals. For example, adder stage 320 of specialized processing block 700C of FIG. 7 may compute the sum of signals D and C (i.e., generate the sum (C+D)).

During step 940, the configurable interconnect circuitry may route the sum of the first and second signals from the adder stage to a multiplier stage in the first specialized processing block. For example, configurable interconnect circuitry that may include multiplexers 345 and 346 in specialized processing block 700C of FIG. 7 may route the sum of D and C from adder stage 320 to multiplier stage 310 of specialized processing block 700C.

During step 950, the configurable interconnect circuitry may route the third signal from the third input to the multiplier stage. For example, configurable interconnect circuitry that may include multiplexers 344 in specialized processing block 700C of FIG. 7 may route the signal (A+B) from input 353 to multiplier stage 310 of specialized processing block 700C.

During step 960, the multiplier stage may compute a product of the third signal and the sum of the first and second signals. For example, multiplier stage 310 of specialized processing block 700C of FIG. 7 may compute the product of the sum (C+D) and the signal (A+B), thereby producing the scaled product sum (A+B)*(C+D).

Figure 10:
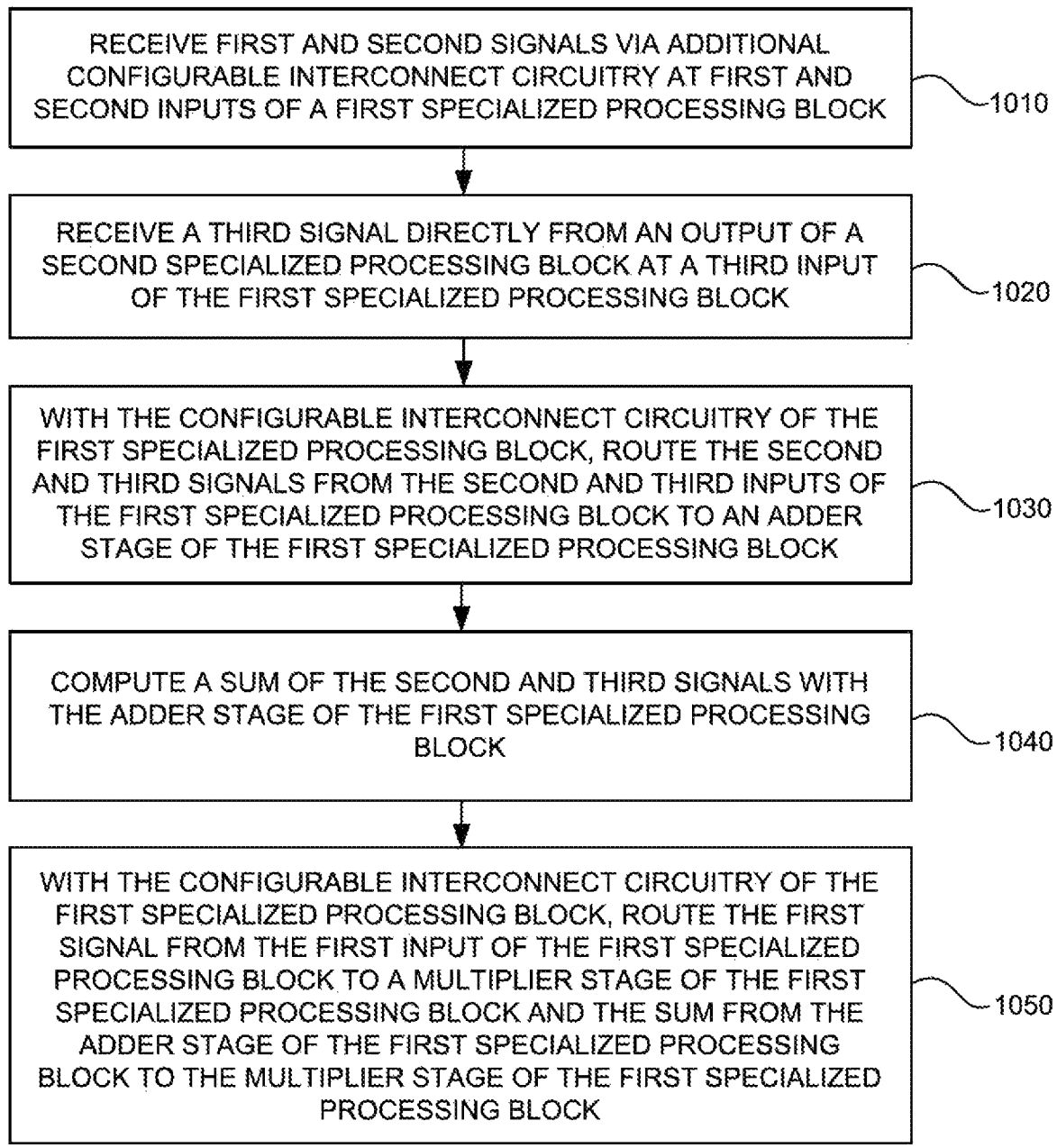
FIG. 10 is a flow chart of illustrative steps for performing a polynomial evaluation using Horner's rule in accordance with an embodiment.

FIG. 10 is a flow chart of illustrative steps for performing a polynomial evaluation using Horner's rule in accordance with an embodiment. During step 1010, first and second inputs of a first specialized processing block may receive first and second signals via additional configurable interconnect circuitry. For example, specialized processing block 300B of FIG. 8 may receive signals X and B at inputs 354 and 352, respectively, whereby signals B and X are routed to inputs 352 and 354 via configurable interconnect circuitry that may be formed externally to the specialized processing blocks of FIG. 7.

During step 1020, a third input of the first specialized processing block may receive a third signal directly from an output of a second specialized processing block. For example, input 355 of specialized processing block 300B of FIG. 8 may receive a signal directly from output 365 of specialized processing block 300A.

During step 1030, configurable interconnect circuitry of the first specialized processing block may route the second and third signals from the second and third inputs of the first specialized processing block to an adder stage of the first specialized processing block. For example, configurable interconnect circuitry that may include multiplexers 342, 349, and 348 in specialized processing block 300B of FIG. 8 may route the signals B and (X+A)*X from inputs 352 and 355, respectively to adder stage 320 of specialized processing block 300B.

During step 1040, the adder stage of the first specialized processing block may compute a sum of the second and third signals. For example, adder stage 310 of specialized processing block 300B of FIG. 8 may compute the sum of (X+A)*X and B. In other words, adder stage 310 of specialized processing block 300B may compute (X+A)*X+B.

During step 1050, the configurable interconnect circuitry of the first specialized processing block may route the first signal from the first input of the first specialized processing block to a multiplier stage of the first specialized processing block and the sum from the adder stage of the first specialized processing block to the multiplier stage of the first specialized processing block. For example, configurable interconnect circuitry that may include multiplexers 344, 345, and 346 in specialized processing block 300B of FIG. 8 may route the signal X from input 354 and signal (X+A)*X+B from adder stage 310, respectively to multiplier stage 310 of specialized processing block 300B.

The method and apparatus described herein may be incorporated into any suitable integrated circuit (IC) or system of integrated circuits. For example, the method and apparatus may be incorporated into numerous types of devices such as microprocessors or other ICs. Exemplary ICs include programmable array logic (PAL), programmable logic arrays (PLAs), field programmable logic arrays (FPGAs), electrically programmable logic devices (EPLDs), electrically erasable programmable logic devices (EEPLDs), logic cell arrays (LCAs), field programmable gate arrays (FPGAs), coarse-grained programmable logic devices (CG-PLDs), coarse-grained reconfigurable arrays (CGRAs), application specific standard products (ASSPs), application specific integrated circuits (ASICs), just to name a few.

The integrated circuit described herein may be part of a data processing system that includes one or more of the following components; a processor; memory; I/O circuitry; and peripheral devices. The data processing system can be used in a wide variety of applications, such as computer networking, data networking, instrumentation, video processing, digital signal processing, or any suitable other application where the advantage of using specialized processing blocks is desirable. The integrated circuit can be used to perform a variety of different logic functions. For example, the integrated circuit can be configured as a processor or controller that works in cooperation with a system processor. The integrated circuit may also be used as an arbiter for arbitrating access to a shared resource in the data processing system. In yet another example, the integrated circuit can be configured as an interface between a processor and one of the other components in the system. In one embodiment, the integrated circuit may be one of the families of programmable logic devices owned by the assignee.

Although the method operations were described in a specific order, it should be understood that other operations may be performed in between described operations, described operations may be adjusted so that they occur at slightly different times or described operations may be distributed in a system which allows the occurrence of the processing operations at various intervals associated with the processing, as long as the processing of the overlay operations are performed in a desired way.

The foregoing is merely illustrative of the principles of this invention and various modifications can be made by those skilled in the art without departing from the scope and spirit of the invention.

What is claimed is:

1. A processing block, comprising:
    a first input that receives a first signal;
    a first multiplexer that receives the first signal from the first input;
    a second input that receives a second signal;
    an adder stage that receives the first signal from the first input and the second signal from the second input and adds the first signal and the second signal to compute a sum, wherein the adder stage receives the first signal from the first multiplexer;
    a second multiplexer that receives the sum from the adder stage;
    a third input that receives a third signal;
    a multiplier block that receives the sum from the second multiplexer, that receives the third signal from the third input, and computes a product of the sum and the third signals;
    a third multiplexer that selects between the sum from the adder stage and the product of the sum and the third signal from the multiplier block to produce a selected signal; and
    an output that outputs the selected signal.

2. The processing block of claim 1, wherein the second multiplexer receives the first signal from the first input.

3. The processing block of claim 1, wherein the multiplier block is fixed point or floating point.

4. The processing block of claim 1, wherein the adder stage is fixed point or floating point.

5. The processing block of claim 1, wherein the processing block can handle 16-bit wide signals, 32-bit wide signals, 64-bit wide signals, or 128-bit wide signals.

6. An apparatus, comprising:
    a first specialized processing block including
        first, second, and third inputs that respectively receive first, second, and third signals,
        configurable interconnect circuitry that routes the first and second signals from the first and second inputs,
        an adder stage that receives the first and second signals from the configurable interconnect circuitry and computes a sum of the first and second signals,
        a first multiplier stage that computes a product of the third signal and the sum of the first and second signals, wherein the configurable interconnect circuitry routes the sum of the first and second signals from the adder stage to the first multiplier stage and routes the third signal from the third input to the first multiplier stage, and
        a multiplexer that selects between (i) the sum of the first and second signals from the adder stage and (ii) the product of the third signal and the sum of the first and second signals from the first multiplier stage.

7. The apparatus of claim 6, further comprising:
    a second specialized processing block including
        a second multiplier stage that receives the product of the third signal and the sum of the first and second signals;
        a fourth input that receives a fourth signal;
        a fifth input that receives a fifth signal;
        additional configurable interconnect circuitry that routes the fourth and fifth signals from the fourth and fifth inputs; and
        an additional adder stage that computes an additional sum of the fourth and fifth signals, wherein the additional adder stage receives the fourth and fifth signals from the additional configurable interconnect circuitry.

8. The apparatus of claim 7, wherein the first specialized processing block further comprises:
    an output that receives the product from the first multiplier stage, and the product is routed from the output via a routing path to a sixth input of the second specialized processing block.

9. The apparatus of claim 8, wherein the routing path directly connects the output to the sixth input.

10. The apparatus of claim 9, wherein the second specialized processing block further comprises a multiplexer that receives the product from the sixth input and the additional sum from the additional adder stage and routes the product to the second multiplier stage.

11. The apparatus of claim 8, wherein the routing path includes external configurable interconnect circuitry that is located outside the first and second specialized processing blocks.

12. The apparatus of claim 11, wherein the second specialized processing block further comprises
    a multiplexer that receives the product from the sixth input and the additional sum from the additional adder stage and routes the additional sum to the second multiplier stage.

13. The apparatus of claim 7, wherein the adder stage or the additional adder stage is configured to determine a difference between the first and second signals or the fourth and fifth signals, respectively.

14. An apparatus, comprising:
    a first specialized processing block, wherein the first specialized processing block includes
        first, second, and third inputs that respectively receive first, second, and third signals,
        a first adder stage that computes a first sum of the second and third signals,
        first configurable interconnect circuitry that routes the second and third signals from the second and third inputs to the first adder stage, wherein the first adder stage receives the second signal via additional configurable interconnect circuitry, and
        a first multiplier stage that receives the first signal via the first configurable interconnect circuitry, wherein the first configurable interconnect circuitry routes the first signal from the first input to the first multiplier stage and the first sum from the first adder stage to the first multiplier stage,
        the first configurable interconnect circuitry including a multiplexer that selects between the third input and the first sum from the first adder stage.

15. The apparatus of claim 14, wherein the first multiplier stage computes a first product of the first sum and the first signal, and the first configurable interconnect circuitry routes the first product from the first multiplier stage to a second output of the first specialized processing block.

16. The apparatus of claim 14, further comprising:
    a second specialized processing block including
        a second multiplier stage that computes a second product;

a first output that outputs the third signal;

second configurable interconnect circuitry that routes the second product from the second multiplier stage to the first output; and fourth and fifth inputs that respectively receive fourth and fifth signals, wherein the second configurable interconnect circuitry routes the fourth and fifth signals from the fourth and fifth inputs to a second adder stage of the second specialized processing block.

17. The apparatus of claim 16, wherein the second specialized processing block further includes the second adder stage, which computes a second sum of the fourth and fifth signals, and the second configurable interconnect circuitry routes a sixth signal from a sixth input of the second specialized processing block to the second multiplier stage and the second sum from the second adder stage to the second multiplier stage.

18. The apparatus of claim 17, wherein the second product is a product of the second sum and the sixth signal.

* * * * *